(12) United States Patent
Roach et al.

(10) Patent No.: US 7,249,875 B1
(45) Date of Patent: Jul. 31, 2007

(54) OFF-ROAD ACCESSORY LIGHT RACK

(75) Inventors: Alan R. Roach, Escondido, CA (US);
Stephen J. Mitchell, Aguanga, CA (US)

(73) Assignee: Baja Designs, Inc., San Marcos, CA (US)

( * ) Notice: Subject to any disclaimer, the term of this patent is extended or adjusted under 35 U.S.C. 154(b) by 41 days.

(21) Appl. No.: 11/108,037

(22) Filed: Apr. 15, 2005

(51) Int. Cl.
*B60Q 1/00* (2006.01)
*F21V 15/04* (2006.01)
*F21V 33/00* (2006.01)
*F21V 7/04* (2006.01)

(52) U.S. Cl. .................. 362/496; 362/369; 362/476; 362/505; 362/549

(58) Field of Classification Search .............. 362/496, 362/36, 473–376, 505–507, 529–530, 549
See application file for complete search history.

(56) References Cited

U.S. PATENT DOCUMENTS

| 3,949,218 | A | | 4/1976 | Hayward |
| 4,357,651 | A | | 11/1982 | Mayer |
| 4,636,922 | A | * | 1/1987 | Takimoto et al. ........... 362/476 |
| 4,722,031 | A | * | 1/1988 | Matsuyama et al. ........ 362/476 |
| 4,742,436 | A | | 5/1988 | Hoggett |
| 5,107,406 | A | | 4/1992 | Sekido et al. |
| 5,611,510 | A | | 3/1997 | Yamamoto |
| 6,079,852 | A | | 6/2000 | Kamaya et al. |
| 6,135,625 | A | * | 10/2000 | Kodaira et al. ............. 362/476 |
| 6,428,197 | B1 | | 8/2002 | Downing |
| 6,764,206 | B1 | | 7/2004 | Felty |
| 6,773,148 | B2 | | 8/2004 | Kasboske |

* cited by examiner

*Primary Examiner*—John Anthony Ward
*Assistant Examiner*—David Makiya
(74) *Attorney, Agent, or Firm*—James E. Curry

(57) ABSTRACT

A light rack assembly for off-road vehicles capable of surviving high vibration loads generated in off-road racing. Each assembly comprises at least one headlight sub-assembly having a center of gravity that, when mounted to the frame of the light rack assembly, resides in a spherical zone defined by the effective radius of the light and the mounting points of the light housing. Each light is isolated from vibration of the vehicle and can be individually adjusted to the preference of the driver without tools. The light rack assembly can be quickly removed from the vehicle, or be mounted such that the assembly can be rotated to adjust the light beams while the vehicle is in motion and rotated to retract the assembly to protect the lights when not in use.

28 Claims, 9 Drawing Sheets

OFF-ROAD ACCESSORY LIGHT RACK

FIELD OF THE INVENTION

The invention relates in general to vehicle light racks mounted to off-road vehicles. More specifically, the invention relates to an off-road accessory light rack where the lights are isolated from vibration of the vehicle and can be individually adjusted to the preference of the driver without the use of tools. In addition, the light rack assembly may be configured to allow the entire rack assembly to pivot in order to either adjust the vertical direction of the beams of light as race conditions change, or to retract the rack assembly to prevent damage to the lights when the vehicle is operated during the day.

BACKGROUND OF THE INVENTION

The technology utilized in off-road vehicle racing has advanced substantially in recent years. These specialized vehicles have sophisticated suspension systems and high powered motors allowing the vehicles to achieve speeds in excess of 130 miles per hour over rough terrain. Many off-road races, such as the SCORE INTERNATIONAL® Baja 1000, require specialized lighting systems be equipped on the vehicles in order to be competitive in night racing conditions. Not only must these light systems be able to survive the high vibration loads encountered under race conditions, but they must be adjustable to optimize visibility for the driver. For instance, in night racing conditions where the terrain is tight with sharp turns, it is preferable to light up terrain close to the vehicle. However, in wide open terrain it is preferable to light up terrain further off in the distance from the vehicle. In addition, it is desirable to provide protection for the lights during daytime racing when the lights are not needed.

Presently, race teams typically purchase light housing assemblies and build custom light rack assemblies for their vehicles. However, these custom assemblies are often limited to the single mounting point provided by the manufacturer. For example, U.S. Pat. Nos. 4,742,436 and 4,357,651 provide single point mounts for the lights. Undesirably, the center of gravity of the light is substantially cantilevered from the single point mount of these designs. Typically, the vibration loads inflicted during off-road racing are so substantial that it is common for these single point mount lights to come out of adjustment, or for the mount point of the light to fail. In addition, these designs are not readily adaptable to allow for adjusting the position of the light while the vehicle is in motion. Thus, there is a need to provide a light rack assembly capable of handling the severe vibration loads inflicted in off-road racing conditions while still providing the ability to adjust the beam of light to the preference of the driver. Further, there is a need to provide an effective way to provide protection for the lights during daylight conditions when the lights are not needed.

BRIEF SUMMARY OF THE INVENTION

The present invention provides its benefits across a broad spectrum of vehicle light racks for off-road vehicles. Although the present invention is discussed in conjunction with high performance off-road race vehicles, it may be used for recreational off-road vehicles as well. While the description which follows hereinafter is meant to be representative of such applications, it is not exhaustive. As will be understood, the basic apparatus taught herein can be readily adapted to many uses. It is intended that this specification and the claims appended hereto be accorded a breadth in keeping with the scope and spirit of the invention being disclosed despite what might appear to be limiting language imposed by the requirements of referring to the specific examples disclosed.

It is one aspect of the present invention to provide a light mounting system for a headlight capable of surviving the high vibration loads generated in off-road racing conditions without loosing the preferred adjustment position of the light.

It is another aspect of the present invention to provide a light rack assembly that can provide protection for the lights during daytime when the lights are not in use.

It is yet another aspect of the present invention to provide a light rack assembly providing vibration isolation between the light housing and the frame of the rack.

It is still yet another aspect of the present invention to provide a means of individually adjusting the direction of each beam of light in the light rack assembly without the need for tools.

It is still yet another aspect of the present invention to provide a light rack assembly wherein all the beams of light in the rack can be adjusted to the preference of the driver while the off-road vehicle is in motion.

It is a feature of the present invention that each light is mounted in a housing that is mounted in a frame such that the center of gravity of each headlight sub-assembly resides within a spherical zone defined by the effective radius of the light and the mounting points of the light housing.

It is another feature of the present invention that vibration is isolated between the light housing and the frame.

It is still another feature of the present invention that a knob is provided on at least one light adjuster to allow for the individual adjustment of each light without the need for tools.

It is still yet another feature of the present invention that vibration is isolated between the frame of the light rack assembly and the off-road vehicle.

It is still yet another feature of the present invention that the light rack assembly can vertically adjust the beams of light by pivoting the frame while the vehicle is in motion.

It is an advantage of the present invention that individual adjustment of each light can be reliably maintained under extreme vibration loads inflicted in off-road racing conditions.

It is another advantage of the present invention that the light rack assembly can be quickly removed from the off-road vehicle without the need for tools during daylight racing conditions, and quickly installed on the vehicle for nighttime racing conditions.

It is still yet another advantage of the present invention that the beams of light in the light rack assembly can be adjusted to the preference of the driver while the vehicle is in motion.

It is still yet another advantage of the present invention that the light rack assembly can be retracted to protect the lights from damage during daylight racing conditions.

These and other aspects, features, and advantages are achieved/attained in the apparatus of the present invention that comprises at least one headlight sub-assembly mounted in a frame adapted to be mounted to an off-road vehicle. The headlight sub-assembly comprises a bulb mounted in a headlight reflector that is mounted in a light housing. The light housing is provided with three mounting points for receiving light adjustors that secure the headlight sub-assembly to the frame. Two of the mounting points are provided on opposed ends of the light housing defining a first centerline. The third mounting point defines a second centerline passing through the third mounting points and intersecting the first centerline at a center point on the first centerline. The three mounting points are positioned on the light housing so that the center of gravity of the headlight sub-assembly resides in a spherical zone having a spherical radius extending from the center point. According to the present invention, the spherical radius has a length no greater than one third the effective radius of the headlight reflector. It has been found that when the center of gravity of the headlight sub-assembly resides within the spherical zone, torsion loads being transferred to the light adjusters due to vibration are substantially minimized allowing each headlight sub-assembly mounted in the frame to maintain its preferred adjustment position.

The frame defines at least one peripheral cell for each headlight sub-assembly. Each peripheral cell is a substantially rigid structure forming an enclosure for each headlight sub-assembly, and has three mounting tabs with slots for receiving light adjusters that secure the headlight sub-assembly to the frame. The slots are adapted to provide individual vertical and horizontal adjustment of the beam of light emanating from each headlight sub-assembly. The frame can be configured to accommodate as many headlight sub-assemblies as desired for a given off-road race vehicle application. The headlight sub-assemblies may be halogen lights or HID (High Intensity Discharge) lights, as desired.

The light adjusters secure the headlight sub-assemblies to the frame while providing a means for isolating vibration between the light housing and frame. Preferably, at least one light adjuster, typically the top adjuster, is provided with a knob that can be turned without tools between a tight position and a loose position to adjust each beam of light. However, all light adjusters may be provided with a knob that can be turned without tools, if desired.

In one embodiment mounting brackets are provided to be attached to the off-road vehicle and to be releasably attached to the frame. A means for isolating vibration between the off-road vehicle and the frame is provided with grommets in the mounting bracket that receive a dowel secured to the frame. Preferably, an interference fit of at least about 20% between the dowel and grommet provides sufficient rigidity in attaching the light rack assembly to the vehicle while also providing excellent vibration damping. The upper member of the frame is secured with at least one strut having a pivotal dowel member received in an additional mounting bracket grommet. All dowel members are secured in the grommets of the mounting brackets with lock pins. In this embodiment, the light rack assembly can be quickly and easily removed from the off-road vehicle simply by removing the lock pins, detaching the electrical connector for the lights, and by pulling the dowels out of the grommets.

In another embodiment utilizing just one headlight sub-assembly, the fame comprises a circular tube member having a web frame support. In this embodiment, it is normally unnecessary to provide for quick installation or removal of the light rack assembly, and the web frame support can be directly mounted to the vehicle.

In another embodiment, the frame is pivotally attached to a frame member of the off-road vehicle, and a linear actuator is provided with one end pivotally attached to a second frame member of the vehicle and the other end pivotally attached to the frame. In this embodiment, the linear actuator can be energized to rotate the light rack assembly to vertically adjust the beams of light of the headlight sub-assemblies to the preference of the driver of the vehicle. In addition, the light rack assembly can be rotated at least about 45 degrees to protect the lights from damage during daylight racing when the lights are not needed. This embodiment is advantageous in applications where it is not desired to remove the light rack assembly during an off-road race.

In another embodiment, the frame is pivotally attached to a frame member of the vehicle and a lever is pivotally attached to a second frame member of the vehicle between a distal and proximal end. The distal end of the lever is pivotally attached to the frame of the light rack assembly and the proximal end pivotally attached to one end of a linear actuator. The other end of the linear actuator is pivotally attached to the second frame member, and the linear actuator can be advantageously located inside the cab of the vehicle, protecting it from the outside environment. In addition, the lever can provide a mechanical advantage for the linear actuator to reduce the vibration loads exerted on the actuator and provide a more fine adjustment of the beams of light. In a similar embodiment, the linear actuator is removed and the proximal end of the lever is rotated manually to adjust the beams of light. A circumferential locking member is provided in communication with the proximal end of the lever, and a means for latching the proximal end to the locking member is provided to secure a desired adjustment position of the beams of light, or to retract the assembly to protect the lights when not in use.

As used herein, the term "pivotally attached" refers to any manner of attaching two rigid members thereby allowing respective rotation between the two members. For example, two members can be pivotally attached by the use of a hinge, a bushing, a bearing, a heim joint, a chain link, or the like. Thus, the term "pivotally attached" refers to any manner of attaching two rigid member allowing respective rotation between the two members as known to those skilled in the art.

BRIEF DESCRIPTION OF THE DRAWINGS

The aspects, features and advantages of the present invention will become apparent upon consideration of the following detailed disclosure of the invention, especially when it is taken in conjunction with the accompanying drawings wherein.

To facilitate understanding, identical reference numerals have been used, where possible, to designate identical elements or features common to the figures.

DETAILED DESCRIPTION OF THE PREFERRED EMBODIMENTS

Figure 1:
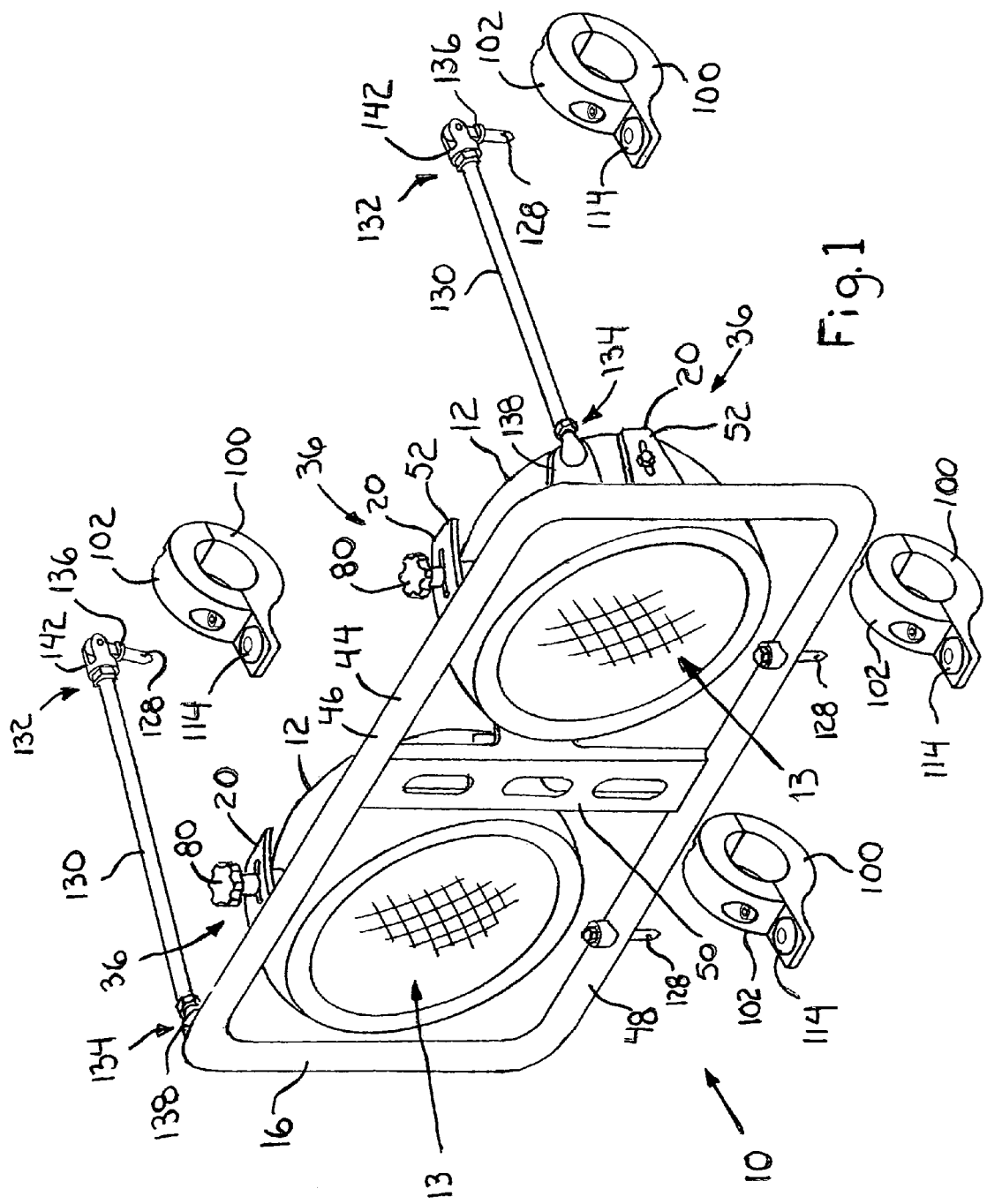
FIG. 1 is a perspective view of an embodiment of the present invention light rack assembly.
Figure 2:
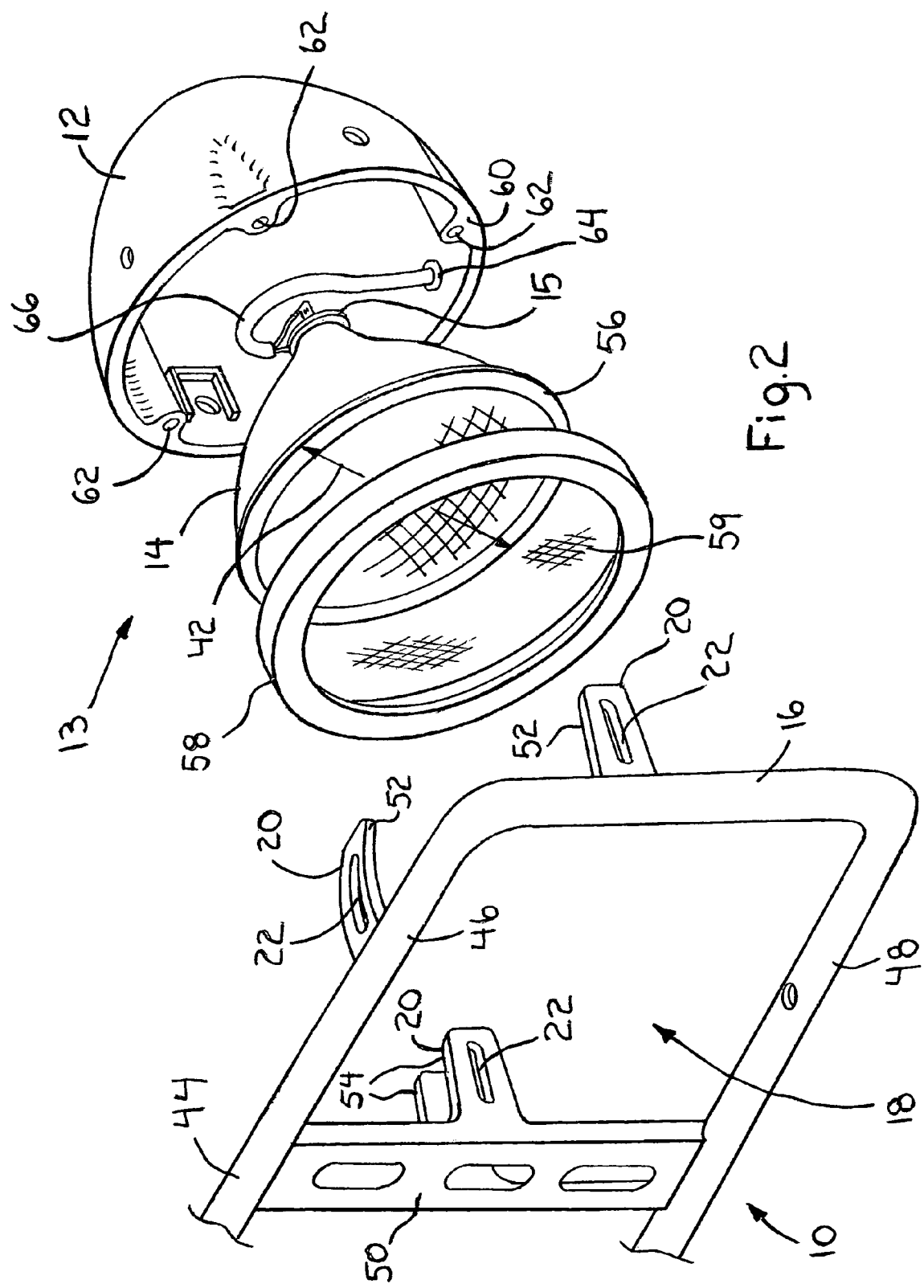
FIG. 2 is an exploded perspective view of a portion of the embodiment in FIG. 1 showing the light rack assembly frame, and headlight sub-assembly.

Referring to FIGS. 1–2, a light rack assembly is shown generally by number 10 in accordance with a first embodiment of the present invention. The light rack assembly 10 comprises at least one headlight sub-assembly, generally shown by numeral 13, and a frame 16 adapted to be mounted to an off-road vehicle (not shown). The headlight sub-assembly 13 comprises a light housing 12, a headlight reflector 14 mounted in the light housing, and a bulb 15 mounted in the headlight reflector. The frame 16 comprises an upper member 46 integral with a lower member 48 defining at least one peripheral cell, generally shown by numeral 18 in FIG. 2, for each headlight sub-assembly 13. Each peripheral cell 18 is a substantially rigid structure forming an enclosure for each headlight sub-assembly, and has three mounting tabs 20 having slots 22 therein for receiving light adjusters 36 that secure the headlight sub-assembly 13 to the frame 16. The slots 22 are adapted to provide individual vertical and horizontal adjustment of the beam of light emanating from each headlight sub-assembly 13.

Figure 3:
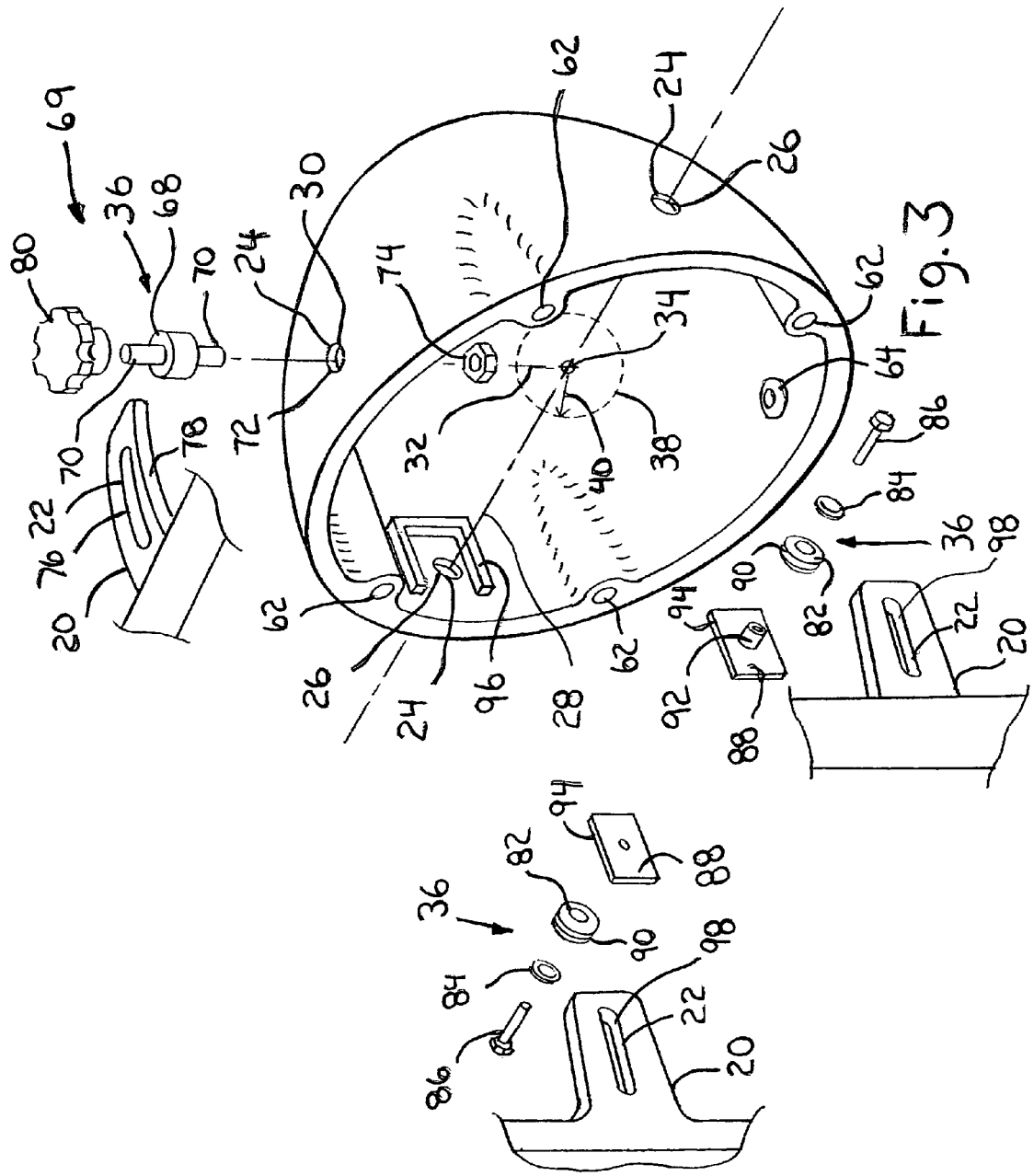
FIG. 3 is an exploded perspective view of another portion of the embodiment in FIG. 1 showing the light housing, light adjusters, and mounting tabs of the frame.

Referring to FIGS. 2–3, the light housing 12 is provided with three mounting points 24 for receiving the light adjustors, generally identified by numeral 36, to mount the headlight sub-assembly 13 to the mounting tabs 20 of the frame 16. Two of the mounting points, identified by numeral 26, are provided on opposed ends of the light housing 12 defining a first centerline, identified by numeral 28. The third mounting point 30, defines a second centerline 32 passing through the third mounting point 30 and intersecting the first centerline 28 at a center point 34 on the first centerline 28. According to the present invention, it is advantageous to position the three mounting points 24 so that the center of gravity of the headlight sub-assembly 13, when mounted in the mounting tabs 20 of the frame 16, will intersect the center point 34. It has been found that, according to the present invention, by positioning the center of gravity of the headlight sub-assembly 13 to coincide with the center point 34, the effects of severe vibration loads exerted on the headlight sub-assembly 13 from an off-road vehicle are minimized. This substantially prevents the undesirable occurrence of each headlight sub-assembly from loosing its individual adjustment during operation of the vehicle.

It is believed that when the center of gravity of the headlight sub-assembly 13 is further from the center point 34, the dynamic torsion loads exerted on the light adjusters 36 due to vibration of the off-road vehicle increase. When these torsion loads are too great for the light adjusters 36 to support, the headlight sub-assembly 13 will undesirably loose its alignment. This phenomenon is common for single mount off-road lights where the center of gravity of the headlight is cantilevered a substantial distance away from the mount. This distance acts as a moment arm in which the severe vibration from the vehicle translates into excessive torsion loads on the mount, often causing the mount to move or fail.

Ideally, when the center of gravity of the headlight sub-assembly 13 resides on the center point 34, there will be no torsion loads transferred to the light adjusters 36 due to vibration of the off-road vehicle. However, it has been found that a certain amount of offset between the center of gravity of the headlight sub-assembly 13 and the center point 34 is acceptable. According to the present invention, the center of gravity of the headlight sub-assembly 13 must reside within a spherical zone concentrically located on the center point 34. Referring to FIG. 3, the spherical zone 38 has a spherical radius 40 having a length no greater than one third the effective radius of the headlight reflector 14. For a circular headlight reflector 14, as shown in FIGS. 1–3, the effective radius is one-half the diameter of the headlight reflector, the headlight reflector diameter shown by numeral 42 in FIG. 2. For a rectangular headlight reflector having a height and width of the sealed lens, the effective radius is calculated according to the following equation:

$$\text{Effective radius} = ((\text{height} + \text{width}) \div 2) \div 2$$

According to the present invention, as long as the center of gravity of the headlight sub-assembly 13 resides within the spherical zone 38 concentrically located on the center point 34 having a spherical radius 40 no greater than one-third the effective radius of the headlight reflector 14, then torsion loads transferred to the light adjusters 36 by the vibration of the vehicle will not be sufficient to alter the adjustment of the headlight sub-assembly 13 in the light rack assembly 10.

Referring to FIGS. 1–2, it is also significant according to the present invention that each peripheral cell 18 comprise a substantially rigid structure forming an enclosure to support the loads transferred from the headlight sub-assembly 13 to the mounting tabs of the frame. Shown in FIGS. 1–2, the upper member 46 and lower member 48 of the frame 16 form a continuous tube structure 44 with the two peripheral cells 18 separated by a stamped channel member 50. The frame is substantially rigid as the channel member 50 is welded to the upper member 46 and lower member 48. Furthermore, two of the mounting tabs, identified by numeral 52, are welded to the continuous tube structure 44 while the mounting tabs identified by numeral 54 are integrally formed into the channel member 50. It is to be appreciated that the continuous tube structure 44 and the stamped channel member 50 can be configured in a variety of ways, utilizing any commercially available material shapes and forms. For example, such shapes as square tubing, I-beam, L-beam, T-beam, or the like, may be used. The frame is preferably made from plain steel; however any metal may be used, if desired, such as aluminum, chromemoly, titanium, or the like.

Although only two headlight sub-assemblies 13 are provided in the embodiment shown in FIGS. 1–3, the frame 16 can be extended and additional channel members 50 welded to the tube structure 44 to accommodate as many headlight sub-assemblies in the light rack assembly 10 as desired. For example, the embodiments shown in FIGS. 8–9 have four peripheral cells 18 to accommodate four headlight sub-assemblies 13. More or less headlight sub-assemblies 13 can be accommodated according to the present invention, as desired.

Referring to FIG. 2, a typical halogen headlight sub-assembly 13 is shown. The headlight sub-assembly 13 comprises a light housing 12, headlight reflector 14, halogen bulb 15, light retainer ring 58, and lens 59. Preferably the light housing 12 is made from a lightweight material so that its mass has little or no effect in translating vibration loads to the light adjusters 36. Glass reinforced nylon for the housing is preferred as it is durable, lightweight, and resistant to sunlight UV radiation. However other materials may be used, such as any thermoplastic or thermoset plastic material, if desired. The headlight reflector 14 has a circular flange 56 that is captured between the light retainer ring 58 and the rim 60 of the light housing 12. Four mounting holes 62 (three seen in FIG. 2) are provided in the light housing 12 for receiving threaded fasteners (not shown) which engage threads provided in the retainer ring 58. Lens 59 is held inside the light retainer ring 58 and provides some protection for the headlight reflector 14 from debris, but may be omitted from the headlight sub-assembly 13, if desired. It is advantageous to seal the headlight reflector 14 in the light housing 12 to prevent moisture or dirt from entering the light housing, although not required. Sealing is achieved by providing an O-ring (not shown) in a groove (not shown) in the rim 60 of the light housing and another O-ring (not shown) inside the retainer ring 58 which both seal against the circular flange 56 of the headlight reflector 14. The light housing is further sealed with the provision of a grommet 64 which seals against the wire harness 66 that enters the light housing 12 and attaches to the bulb 15 mounted in the headlight reflector 14 to provide power to the light.

It is to be appreciated that the headlight sub-assembly may be a HID (High Intensity Discharge) light assembly, if desired. If a HID bulb is used, the ballast necessary to initiate the arc in the bulb and to regulate the current to the bulb may be mounted inside the light housing 12. Mounting the ballast inside the light housing 12 is preferred as the light housing 12 provides protection for the ballast from exposure to the extreme environment encountered in off-road racing. When the ballast is mounted in the light housing 12, its weight and location must be taken into account in determining the center of gravity of the headlight sub-assembly 13. Alternatively, the ballast could be mounted separately to the frame 16, which would desirably eliminate the weight of the ballast from the headlight sub-assembly at the expense of exposing the ballast to the environment.

The light adjusters, generally shown by numeral 36 in FIG. 3, provide a means for isolating vibration between the headlight sub-assembly 13 and the frame 16. The top light adjuster, generally identified by numeral 69, comprises an isolation mount 68 having two opposed threaded ends 70. The isolation mount 68 is comprised of vulcanized rubber affixed between the opposed threaded ends 70. One threaded end is received through mounting point 72 and secured to the light housing 12 with a washer (not shown) and locknut 74. The other threaded end is received through slot 76 of mounting tab 78 and is threadably engaged by knob 80. Significantly, the knob can be turned without tools between a tight position and a loose position to adjust the beam of light. In this embodiment, the mounting tab 78 has a curvature in radial alignment with the center point 34, and slot 76 has a sufficient length to provide at least about 22 degrees of rotation of the headlight sub-assembly 13 about the second centerline 32.

In FIG. 3, the light adjusters 36 in communication with the two opposed mounting points 26 of the light housing 12 comprise a grommet 82, washer 84, threaded fastener 86, and flanged retaining nut 88. The grommet 82 has a recess 90 that engages the hole of mounting point 26. The flanged retaining nut 88 has an integral bushing portion 92 that is internally threaded to receive the threaded fastener 86. With the grommet 82 inserted into the hole of mounting point 26, the bushing portion 92 of the retaining nut 88 is inserted into the grommet from inside the light housing 12 and the rectangular flanged portion 94 of the retaining nut 88 is captured in an integral U-shaped retaining wall 96 formed in the light housing 12. The U-shaped retaining wall 96 secures the retaining nut 88 and prevents it from turning when the threaded fastener 86 is received in the retaining nut 88. The threaded fastener 86 receives the washer 84 and is inserted through slot 98 to engage the retaining nut 88. The bushing portion 92 is sized in accordance with the grommet so that when the fastener is tightened the walls of the grommet securely hold the light housing 12 to the mounting tab 20 of the frame 16 yet still allowing the headlight sub-assembly 13 to be rotated about the second centerline 28 when the top light adjuster 69 is in the loose position.

The light adjusters 36 in communication with the opposed mounting points 26 of the light housing 12 can be configured in a variety of alternative ways. For example, a knob, similar to knob 80, but having a threaded end could replace the fastener 86, allowing the light adjuster to be turned without tools between the tight position and the loose position. In addition, the flanged retaining nut 88 could be replaced with a threaded insert embedded into the light housing 12 at the two opposed mounting points 26. Whatever configuration used, a grommet or other elastomeric element should be incorporated to isolate vibration between the light housing 12 and the frame 16.

Figure 4:
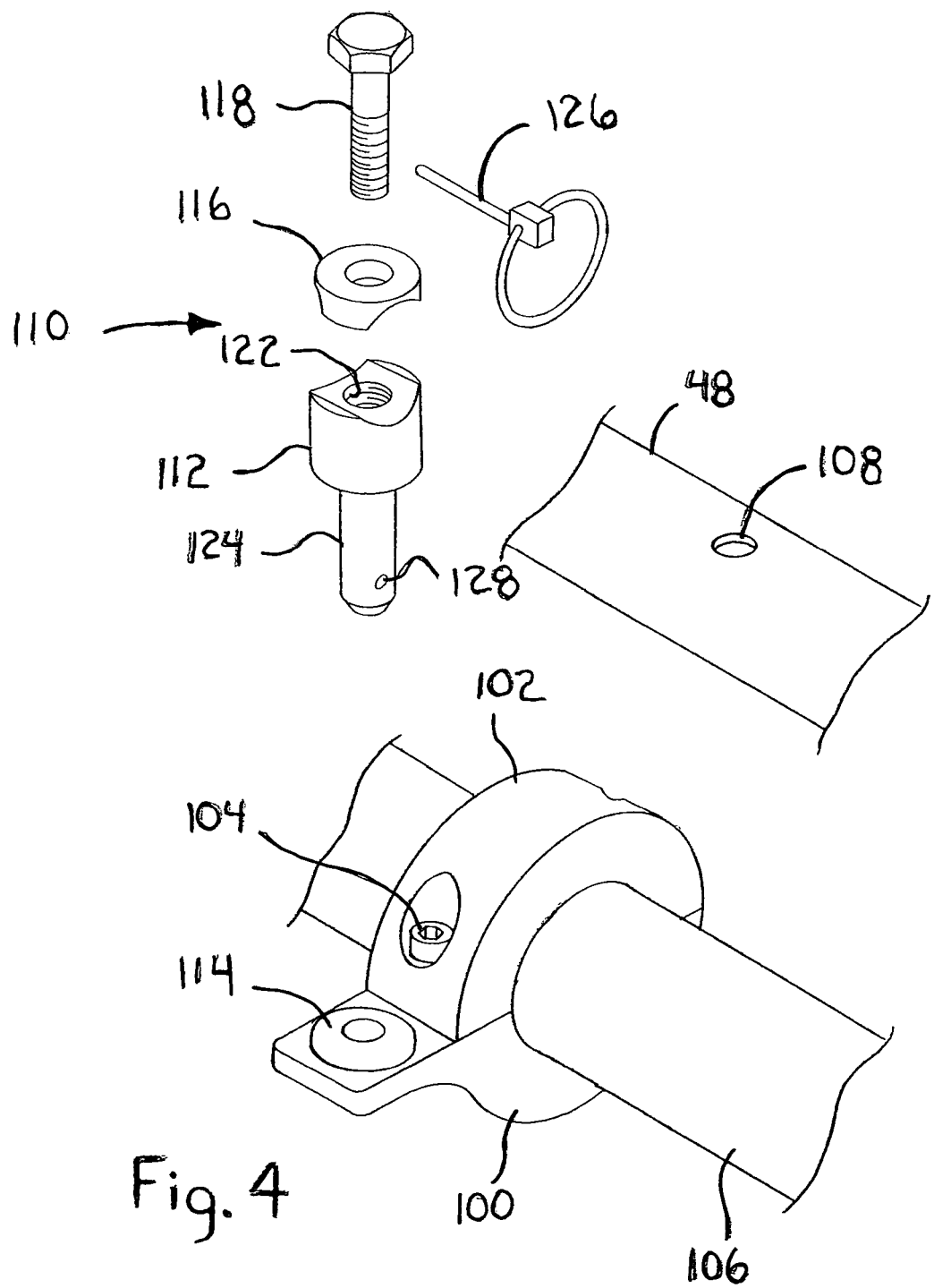
FIG. 4 is an exploded perspective view of another portion of the embodiment in FIG. 1 showing the dowel, lower portion of the frame, mounting bracket, and grommet.

Referring to FIG. 1 and FIG. 4, mounting brackets 100 are provided to be attached to the off-road vehicle and to be releasably attached to the frame 16. Shown in FIG. 4, the mounting bracket 100 further comprises an upper clamp member 102 and two fasteners 104 (only one seen in FIG. 4) which engage a frame member 106 of the off-road vehicle. In order to further isolate vibration, a means for isolating vibration between the off-road vehicle the frame 16 is provided. The lower member 48 of the frame 16 is provided with a through hole 108 in which a dowel assembly, generally identified by numeral 110, is installed. The dowel assembly comprises a dowel member 112 which is secured to the lower member 48 of the frame with a fastener 118 received through a washer 116, the through hole 108, and into a threaded portion 122 of the dowel member 112. Alternatively, the dowel could be welded directly to the lower member, if desired, thereby eliminating the fastener 118 and washer 116. With the dowel assembly 110 secured to the lower member 48, the end of the dowel 124 of the dowel member 112 is inserted into a grommet 114 received in an opening of the mounting bracket 100. Significantly, an interference fit between the opening in the grommet 114 and the diameter of the end of the dowel 124 of at least about 20% provides sufficient rigidity in attaching the light rack assembly 10 to the off-road vehicle while also providing excellent vibration damping. The diameter of either the dowel or the diameter of the opening in the grommet can be determined from the following equation:

$$20\% = ((\text{Pin O.D.} - \text{Grommet I.D.}) \div \text{Pin O.D.}) \times 100$$

where:

Pin O.D.=Outside Diameter of the Dowel

Grommet I.D.=Inside Diameter of the Grommet.

Thus, for a given dowel outside diameter or a given grommet inside diameter, the other diameter can be determined.

With this interference fit, it is desirable that the end of the dowel 124 be chamfered or beveled in order to facilitate inserting the end of the dowel 124 into the grommet 114. It is generally desirable to lubricate the grommet 114 with grease, petroleum jelly, or other thick lubrication material to further facilitate the insertion of the dowel member 112 into the grommet 114. Once in place, lock pin 126 is inserted into a through hole 128 in the dowel member 112 to secure the light rack assembly 10 to the off-road vehicle. Although other locking configurations can be used, the lock pin 126 is preferred since the light rack assembly 10 can be quickly and easily removed from the vehicle without the need for tools. This quick release feature is often desired by those who only want to install the light rack assembly 10 at dusk and do not wish to carry the light rack assembly on the vehicle during daylight racing.

Figure 5:
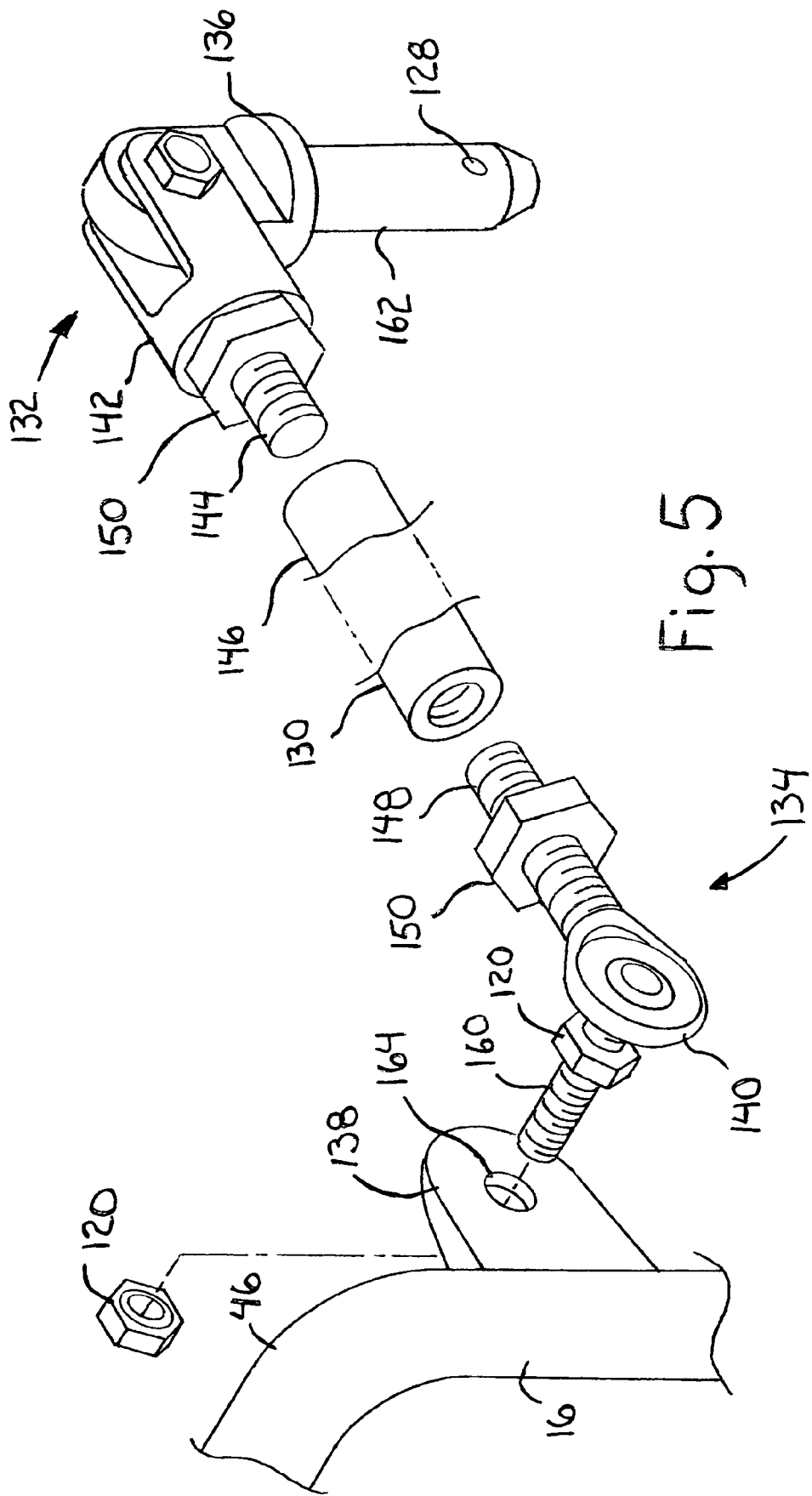
FIG. 5 is an exploded perspective view of another portion of the embodiment in FIG. 1 showing the strut and dowel.

Referring to FIGS. 1 and 5, the upper member 46 of the frame 16 is secured to an additional mounting bracket 100 with at least one strut 130. In the embodiment shown, two struts are used to secure the upper member 46 to the off-road vehicle, however one strut can suffice depending on the application. The strut 130 has one end, generally identified by numeral 134, attached to the upper member 46 of the frame 16, and the other end, generally identified by numeral 132, attached to the off road vehicle. In the embodiment shown, end 132 is pivotally attached to a dowel member 136 via coupling 142, and the dowel member 136 is inserted into another grommet 114 of another mounting bracket 100 (shown in FIG. 1) and secured with a lock pin 126 (not shown). The other end 134 is pivotally attached to a welded tab 138 on the upper member 46 via a heim joint 140. Pivotal attachment of the strut 130 is preferred as it provides greater flexibility for installing the light rack assembly 10 to a particular off-road vehicle, however, the strut could be rigidly attached, if desired.

Referring to FIG. 5, another feature of the strut 130 is that its length is adjustable. The coupling 142 has a threaded end 144 that engages one threaded end of the strut main member 146 and the heim joint 140 has a threaded end 148 engaging the other threaded end of the strut main member 146. Once the strut is adjusted to the desired length, lock nuts 150 residing on the threaded ends of the heim joint 140 and coupling 142 are tightened against the strut main member 146 to secure the strut 130. Similarly, the other end 160 of the heim joint 140 is threaded and provided with two lock nuts 120 to secure the heim joint to the hole 164 provided in the welded tab 138.

Dowel end 162 of dowel member 136 is configured the same as the dowel end 124 of dowel member 112 and has the same interference fit of at least about 20% fit with the grommets 114, as discussed previously. In the embodiment shown in FIGS. 1–5, the light rack assembly 10 can be quickly and easily installed without the use of tools by inserting the dowel ends (124 and 162) into their respective mounting bracket grommets 114, and then securing the assembly in place by installing the lock pins 126 into the through holes 128 of the dowel ends. Conversely, the light rack assembly 10 can be quickly and easily removed with the use of tools by removing the lock pins 126 from the dowel ends (124 and 162) and then by pulling the dowels out of their respective mounting bracket grommets 114. Although not shown, the only other step in installing or removing the light rack assembly 10 is to connect or disconnect one electric connector that provides power to the lights, which can also be accomplished without the use of tools.

Figure 6:
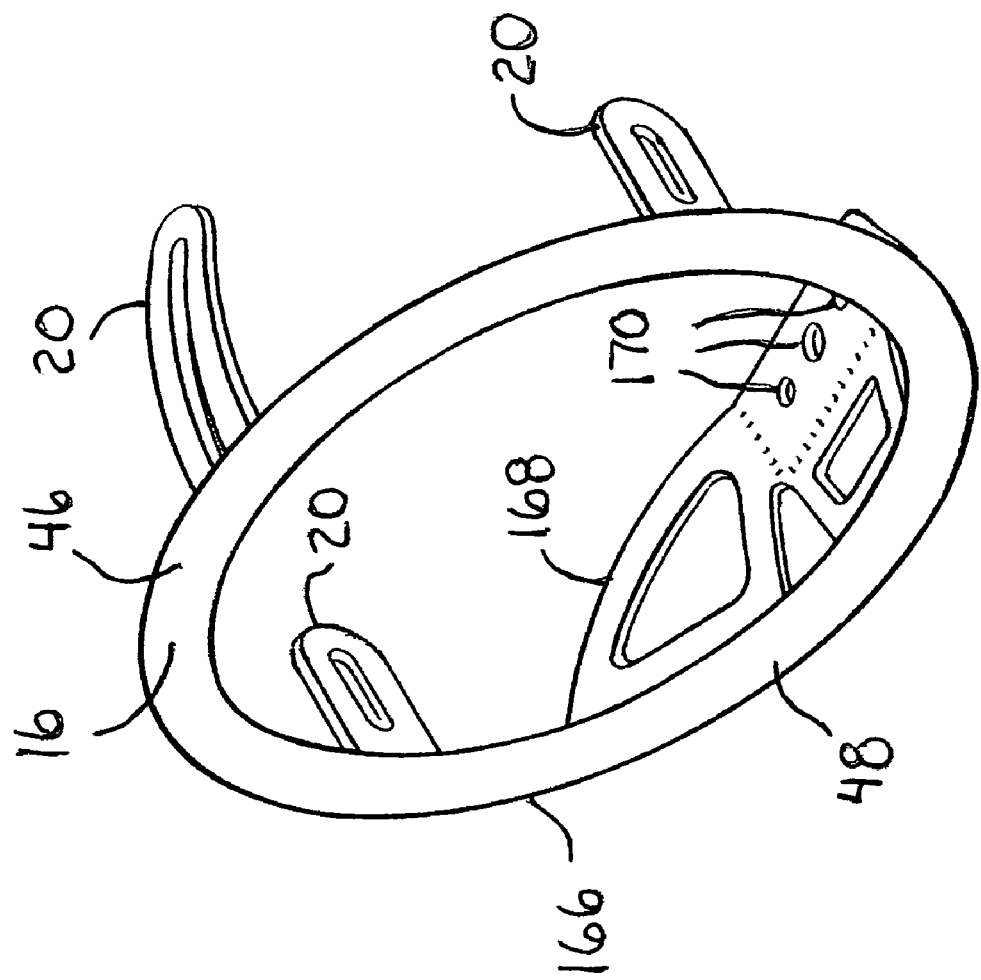
FIG. 6 is a perspective view of another embodiment of the present invention light rack assembly showing an alternative frame.

An alternative embodiment of the frame 16 of the present invention is shown in FIG. 6. In this embodiment the frame 16 is configured for mounting just one headlight sub-assembly 13, as discussed previously with reference to FIGS. 2–3. The frame 16 comprises a circular tube member 166 in which mounting tabs 20 are welded. With just one light, it is normally unnecessary to provide for quick installation or removal. Instead, a web frame support 168 is welded to the circular tube member and is provided with mounting holes 170 for attaching the frame 16 to the off-road vehicle.

Figure 7:
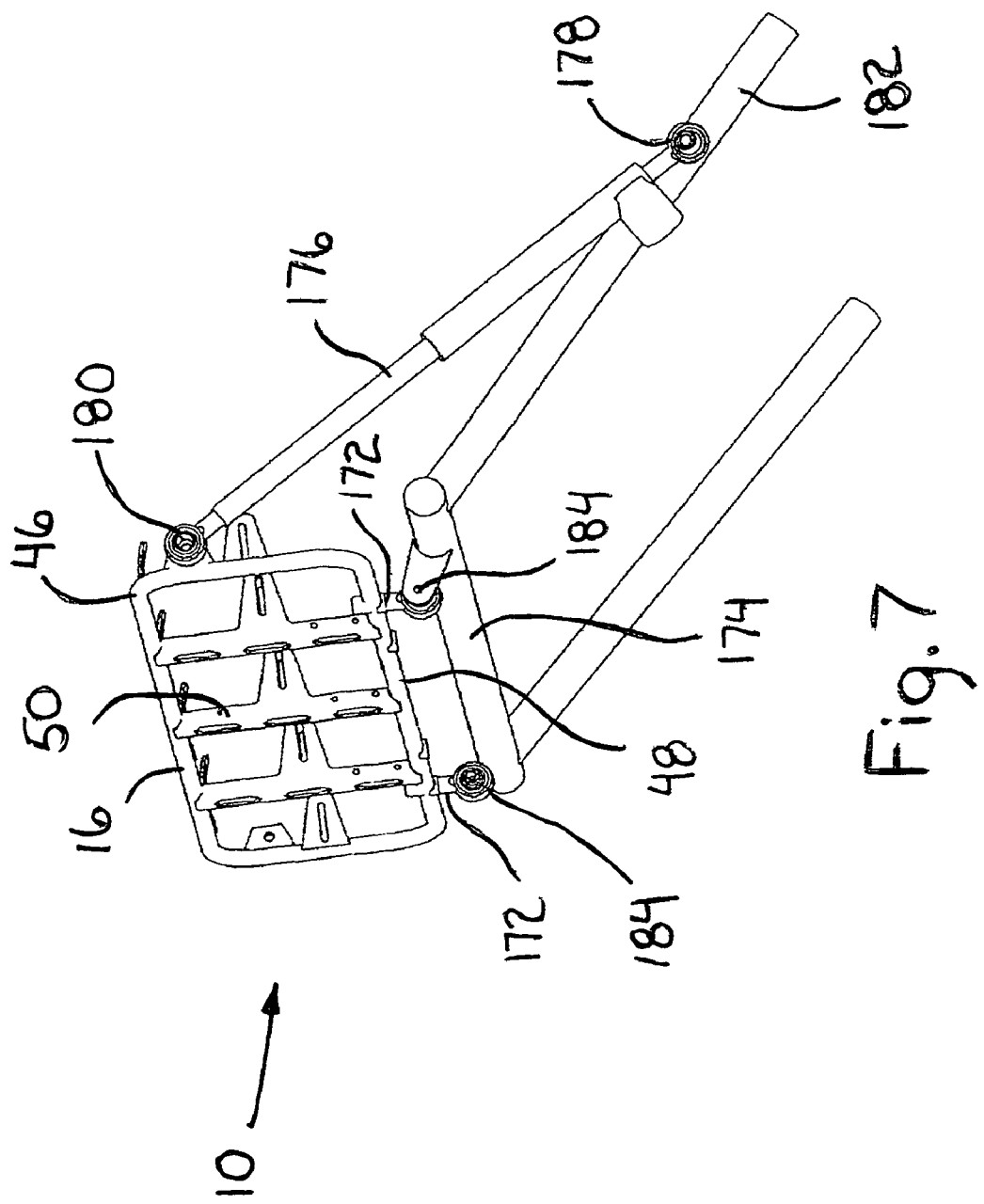
FIG. 7 is a perspective view of another embodiment of the present invention light rack assembly utilizing a linear actuator.

Referring now to FIG. 7, an alternative embodiment of the present invention light rack assembly 10 is shown (with the four headlight sub-assemblies removed). In this embodiment, a means for vertically adjusting the beams of light by rotating the frame 16 about a pivotal attachment of the lower member 48 to a frame member 174 of the off-road vehicle is provided. The lower member 48 of the frame 16 has two mounting tabs 172 welded in place to the lower member 48 and a pivotal attachment point 184 is provided between the mounting tabs 172 and a frame member 174 of the off-road vehicle. A linear actuator 176 having opposed ends is provided, one end 178 pivotally attached to a second frame member 182 of the off-road vehicle and the other end 180 pivotally attached to the upper member 46 of the frame 16. The attachment points 184 and ends of the linear actuator (178 and 180) may be pivotally attached by use of bushings, bearings, or heim joints as discussed previously. In this embodiment, the linear actuator 176 can be energized to rotate the light rack assembly 10 to vertically adjust the beams of light of the headlight sub-assemblies to the preference of the driver of the off-road vehicle while the vehicle is in motion. Advantageously, when the terrain is tight and requires slower racing speeds, the driver or passenger can energize the linear actuator to optimally adjust the beams of light toward terrain that is closer to the vehicle. Conversely, when the terrain is more wide open allowing for higher speeds, the linear actuator can be energized to optimally adjust the beams of light toward terrain that is further away from the vehicle. In addition, the linear actuator can be energized retract the light rack assembly 10 by rotating the light rack assembly 10 at least about 45 degrees to protect the lights from damage during daylight racing when the lights are not needed. Preferably, the light rack assembly 10 can be retracted at least about 100 degrees to protect the lights. This amount of retraction is also desirable when transporting the off-road vehicle in an enclosed trailer, particularly when the light rack assembly 10 is mounted on the top of the cab of the vehicle for it provides additional clearance between the vehicle and the enclosed trailer.

Figure 8:
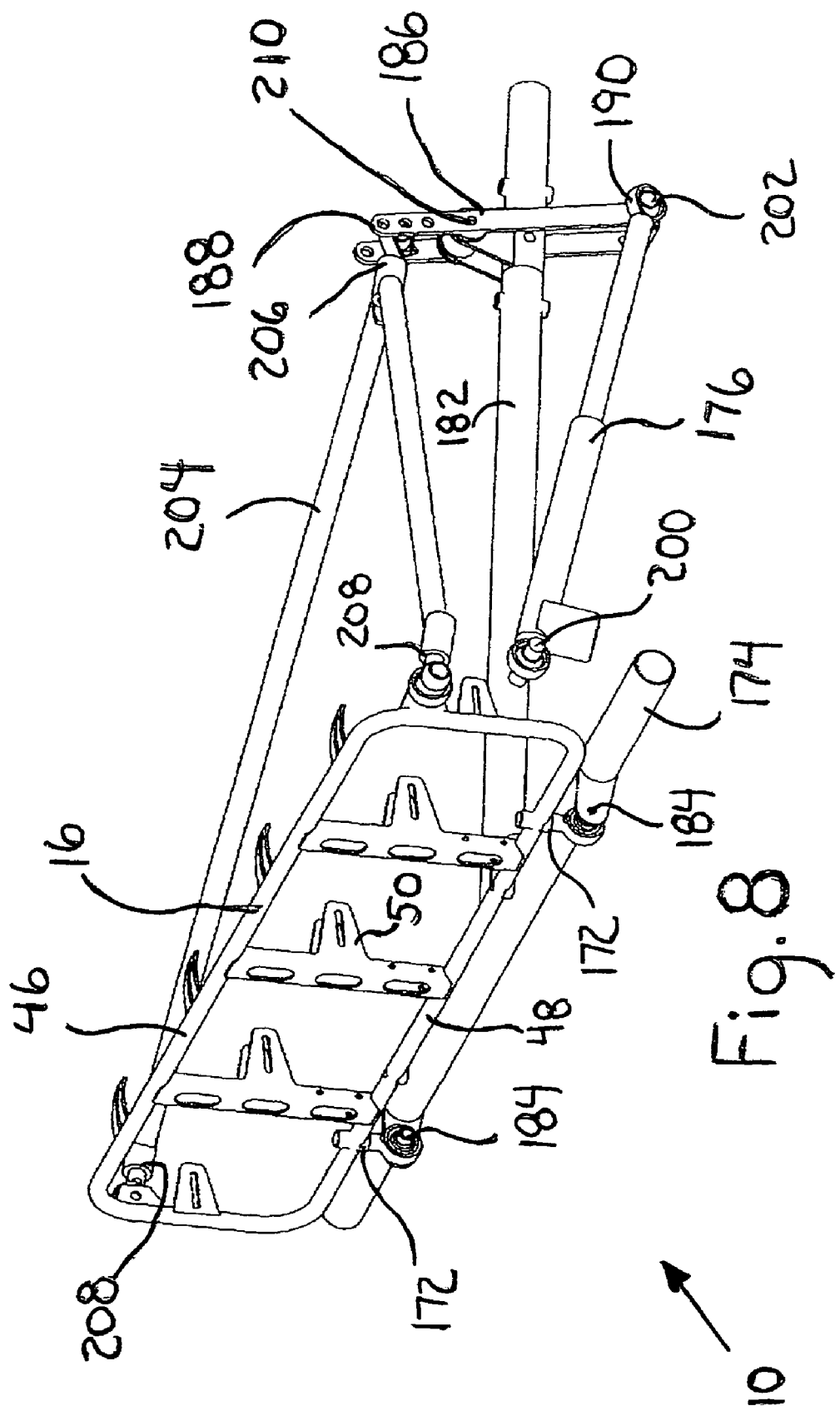
FIG. 8 is a perspective view of another embodiment of the present invention light rack assembly utilizing a linear actuator, lever, and link member.

Referring now to FIG. 8, another alternative embodiment of the present invention light rack assembly 10 is shown. In this embodiment, the frame 16 is pivotally attached to a frame member 174 of the off-road vehicle in the same manner as the embodiment in FIG. 7. However, the light rack assembly 10 further comprises a lever 186 having a distal end 188 and a proximal end 190. The lever 186 is pivotally attached to the second frame member 182 at a location 210 on the lever between the distal and proximal ends (188 and 190). The linear actuator 176 is pivotally attached at one end 200 to the second frame member 182 and at the other end 202 to the proximal end 190 of the lever 186. A V-shaped link member 204 is provided that is pivotally attached at a central end 206 to the distal end 188 of the lever 186 and at the other two ends 208 to the upper member 46 of the frame 16. Alternatively, the link member 204 need not be a V-shaped member attached at both ends of the upper member 46 of the frame 16, but could be pivotally attached at one end 206 to the distal end 188 of the lever and at another end to the upper member 46 at any desired location. However, the V-shape configuration shown provides the best support for the light rack assembly 10, particularly when configured to support four or more headlight sub-assemblies.

The embodiment shown in FIG. 8 provides the same ability to adjust the beams of light of the light rack assembly 10 when the vehicle is in motion as does the embodiment shown in FIG. 7. However, in the embodiment shown in FIG. 8 the linear actuator 176 is advantageously located below the second frame member 182, which, when the light rack assembly is installed on the top of the cab of an off-road vehicle, the linear actuator is located inside the cab of the vehicle. This protects the linear actuator from the outside environment, in which rain or debris could damage the actuator. In addition, the location 210 of the pivot position of the lever 186 to the second frame member 182 can be configured to provide a mechanical advantage for the linear actuator 176 when rotating the light rack assembly. This can not only reduce the vibration loads exerted on the linear actuator while operating the vehicle, but also provide a more fine adjustment of the beams of light when energizing the linear actuator.

Figure 9:
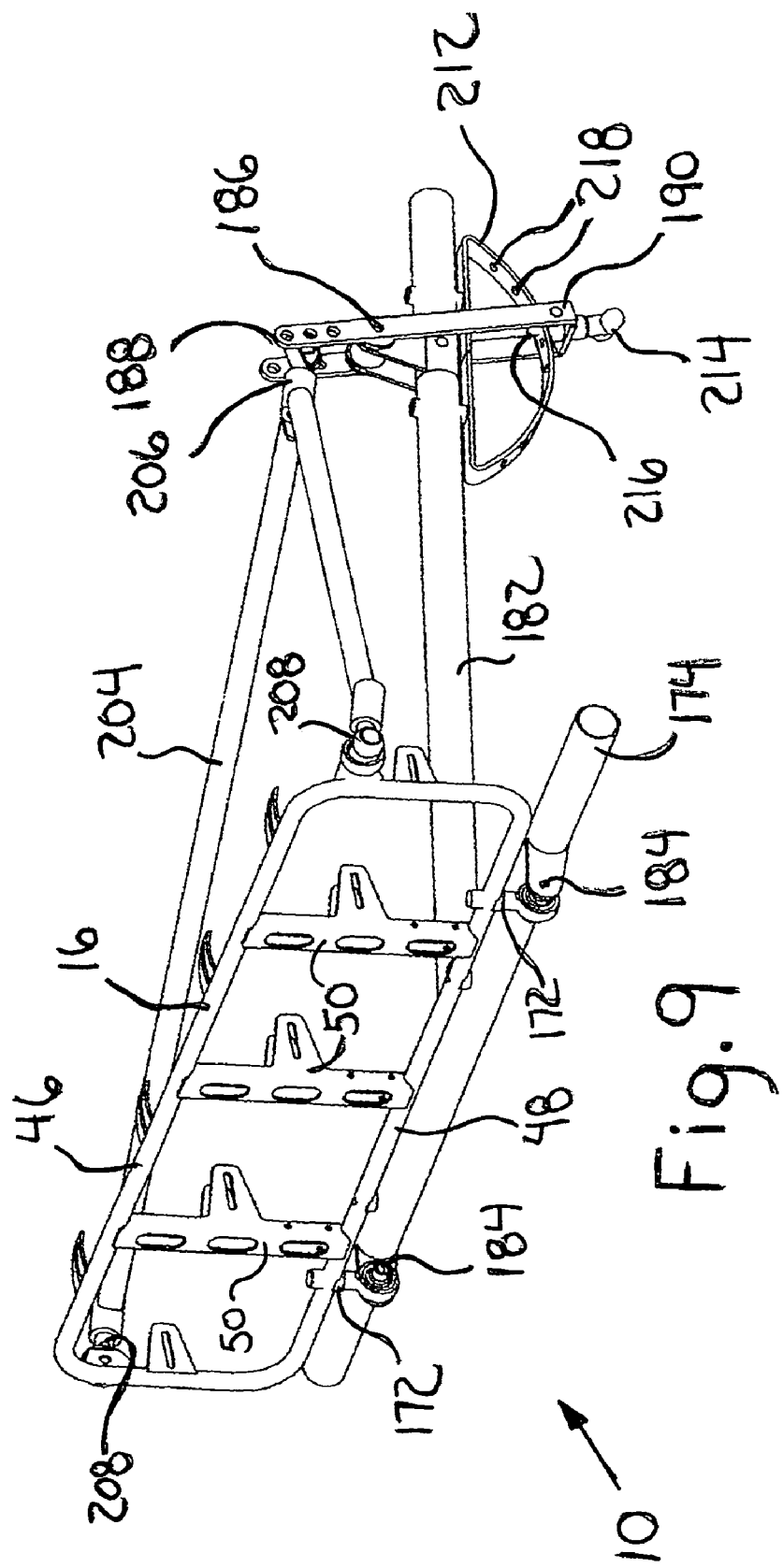
FIG. 9 is a perspective view of another embodiment of the present invention light rack assembly utilizing a manually operated lever.

Another alternative embodiment of the present invention light rack assembly 10 is shown in FIG. 9. This embodiment is similar to the embodiment shown in FIG. 8, however the linear actuator is removed and the proximal end 190 of the lever 186 is rotated manually to adjust the beams of light. A circumferential locking member 212 is attached to the second frame member 182 of the off-road vehicle and is in communication with the proximal end 190 of the lever 186. A means for latching the proximal end 190 of the lever 186 is provided comprising a spring loaded handle 214 attached to the proximal end 190. The spring loaded handle 214 has a protruding rod 216 biased by the spring loaded handle 214 to engage adjustment holes 218 in the circumferential locking member 212 to secure the position of the light rack assembly. Alternatively the spring loaded handle could be attached to a mechanical brake which latches the position of the lever 186 by providing a sufficient braking force to the circumferential member, if desired. In this embodiment, the driver or passenger can manually pivot the light rack assembly 10 to the preference of the driver, or retract the assembly to protect the lights when not in use, while the vehicle is in motion or at rest.

What has been described are preferred embodiments of a light rack assembly adapted to be mounted to an off-road vehicle in which modifications and changes may be made without departing from the spirit and scope of the accompanying claims. Although only certain embodiments have been described above in detail, those skilled in the art will appreciate that numerous modification are possible without materially departing from the novel teachings and advantages of the subject matter described herein. Other modifications, substitutions, changes, and omissions may be made in the design, operating conditions, and arrangement of the preferred and other exemplary embodiments without departing from the spirit of the present invention.

What is claimed is:

1. A light rack assembly adapted to be mounted to a off-road vehicle, the light rack assembly comprising:
   at least one headlight sub-assembly comprising;
      a) a light housing having three mounting points, two of the mounting points on opposed ends of the light housing defining a first centerline between the two mounting points, the third mounting point being on the housing and defining a second centerline between the third mounting point and the first centerline, the second centerline passing through the third mounting point and intersecting the first centerline at a center point;
      b) a headlight reflector mounted in the light housing the headlight reflector having an effective radius,
      c) a bulb mounted in the headlight reflector,
      wherein the headlight sub-assembly has a center of gravity residing within a spherical zone having a spherical radius about the center point, the spherical radius having a length being one third the effective radius, the headlight reflector and the bulb providing a beam of light when the bulb is energized;
   a frame adapted to be mounted to the off-road vehicle, the frame comprising an upper member integral with a lower member defining at least one peripheral cell for each headlight sub-assembly, the peripheral cell having three mounting tabs in communication with the mounting points of the light housing, the mounting tabs having slots adapted to allow for adjusting the direction of the beam of light;
   a plurality of light adjusters in communication with the mounting tabs of the frame and the mounting points of the light housing, the light adjusters having a tight position for securing the headlight sub-assembly to the frame and a loose position for adjusting the direction of the beam of light, at least one light adjuster having a knob that can be turned without tools between the tight position and the loose position for adjusting the beam of light; and,
   a means for isolating vibration between the headlight sub-assembly and the frame.

2. The light rack assembly of claim 1 wherein the upper member and the lower member of the frame form a circular tube member, the frame further comprising a web frame support integral with the lower member of the circular tube member, the web frame support having mounting holes for attaching the light rack assembly to the off-road vehicle.

3. The light rack assembly of claim 1 wherein the headlight sub-assembly further comprises a light retainer ring and a lens, the light retainer ring mounted to the light housing and retaining the lens and the headlight reflector in the light housing.

4. The light rack assembly of claim 1 wherein the bulb is a HID bulb and the headlight sub-assembly further comprises a ballast box mounted inside the light housing for energizing the HID bulb.

5. The light rack assembly of claim 1 wherein all the light adjusters have a knob that can be turned without tools between the tight position and the loose position for adjusting the beam of light.

6. The light rack assembly of claim 1 wherein the light adjuster having the knob is in communication with the third mounting point and adjusts the direction of the beam of light by rotating the headlight sub-assembly about the second centerline.

7. The light rack assembly of claim 6, wherein the means for isolating vibration between the headlight sub-assembly and the frame for the light adjuster having the knob comprises an isolation mount, the isolation mount having two opposed threaded ends, one end fastened to the third mounting point of the housing and the other end received in the slot of the mounting tab and engaging the knob.

8. The light rack assembly of claim 7 wherein the mounting tab engaging the knob has a curvature in radial alignment with the center point, and the slot of the mounting tab having sufficient length to provide at least about 22 degrees of rotation of the headlight sub-assembly about the second centerline.

9. The light rack assembly of claim 8 wherein the two opposed mounting points of the light housing are threaded for receiving corresponding light adjusters, the means for isolating vibration between the headlight sub-assembly and the frame for the two opposed mounting points comprises a grommet in communication with the two opposed threaded mounting points of the light housing, and the corresponding light adjusters comprise a threaded fastener which securely holds the corresponding mounting tabs against the grommets when in the tight position.

10. The light rack assembly of claim 8 wherein the two opposed mounting points of the light housing are through holes and the corresponding light adjusters comprise a flanged retaining nut, a grommet, and a threaded fastener, the grommets received in the through holes of the two opposed mounting points, the flanged retaining nuts having an integral bushing portion received in the grommets, and the threaded fasteners securely holding the corresponding mounting tabs against the grommets when engaging the flanged retaining nuts in the tight position.

11. The light rack assembly of claim 10 wherein the light adjuster threaded fasteners are mounted to knobs that can be turned without tools between the tight position and the loose position for adjusting the beam of light.

12. The light rack assembly of claim 1, further comprising;
at least one mounting bracket releasably attached to the frame and adapted to be attached to the off-road vehicle; and,
means for isolating vibration between the off-road vehicle and the frame.

13. The light rack assembly of claim 12 further comprising:
at least one strut having opposed ends, one end of the strut attached to the upper member of the frame and the other end attached to the off-road vehicle, the lower member having at least two dowels in communication with the means for isolating vibration between the off-road vehicle and the frame; and,
the means for isolating vibration between the off-road vehicle and the frame comprises each mounting bracket having an opening receiving a grommet, the grommets having an opening for receiving the dowels of the lower member of the frame and sized to provide an interference fit of at least about 20% between the dowels and the grommets.

14. The light rack assembly of claim 12 further comprising:
at least one strut having opposed ends, one end of the strut attached to the upper member of the frame and the other end of the strut attached to a dowel, the lower member having at least two dowels in communication with the means for isolating vibration between the off-road vehicle and the frame; and,
the means for isolating vibration between the vehicle and the frame further comprises each mounting bracket having an opening receiving a grommet, the grommets having an opening for receiving the dowels of the struts and the dowels of the lower member, the grommets sized to provide an interference fit of at least about 20% between the dowels and the grommets.

15. The light rack assembly of claim 14 wherein the ends of the strut are pivotally attached respectively to the upper member of the frame and the dowel.

16. The light rack assembly of claim 15 wherein the pivotal attachment of the strut to the upper member of the frame comprises a heim joint and a fastener, the fastener respectively engaging the upper member of the frame.

17. The light rack assembly of claim 16 wherein each dowel is secured in its respective grommet by a lock pin engaging a through hole in each dowel.

18. The light rack assembly of claim 12 further comprising:
means for attaching the mounting brackets to the off-road vehicle.

19. The light rack assembly of claim 18, the means for attaching the mounting brackets to the off-road vehicle comprises welding the mounting brackets to the vehicle.

20. The light rack assembly of claim 18, the means for attaching the mounting brackets to the off-road vehicle comprises a clamp member and at least two fasteners, the mounting bracket and the clamp member adapted to engage a frame member of the off-road vehicle, the fasteners attaching the clamp member to the mounting bracket and securely holding the engagement of the clamp member and mounting bracket to the frame member.

21. A light rack assembly adapted to be mounted to a off-road vehicle, the light rack assembly comprising:
at least one headlight sub-assembly comprising;
a) a light housing having three mounting points, two of the mounting points on opposed ends of the light housing defining a first centerline between the two mounting points, the third mounting point being on the housing and defining a second centerline between the third mounting point and the first centerline, the second centerline passing through the third mounting point and intersecting the first centerline at a center point;
b) a headlight reflector mounted in the light housing the headlight reflector having an effective radius,
c) a bulb mounted in the headlight reflector,
wherein the headlight sub-assembly has a center of gravity residing within a spherical zone having a spherical radius about the center point, the spherical radius having a length being one third the effective radius, the headlight reflector and the bulb providing a beam of light when the bulb is energized;
a frame comprising an upper member integral with a lower member defining at least one peripheral cell for each headlight sub-assembly, the peripheral cell having three mounting tabs in communication with the mounting points of the light housing, the mounting tabs having slots adapted to allow for adjusting the direction of the beam of light, the lower member pivotally attached to a frame member of the off-road vehicle;
a plurality of light adjusters in communication with the mounting tabs of the frame and the mounting points of the light housing, the light adjusters having a tight position for securing the light housing to the frame and a loose position for adjusting the direction of the beam of light, at least one light adjuster having a knob that can be turned without tools between the tight position and the loose position for adjusting the beam of light;
a means for isolating vibration between the headlight sub-assembly and the frame; and,
a means for vertically adjusting the beam of light of the light rack assembly by rotating the frame about the pivotal attachment of the lower member to the frame member of the vehicle.

22. The light rack assembly of claim 21 wherein:
the means for vertically adjusting the beam of light of the light rack assembly comprises a linear actuator having opposed ends, one end pivotally attached to a second frame member of the off-road vehicle and the other end pivotally attached to the upper member of the frame; and, wherein the linear actuator can be energized to rotate the light rack assembly and thereby vertically adjust the beam of light to the preference of a driver of the off-road vehicle when the vehicle is in motion.

23. The light rack assembly of claim 22 wherein the linear actuator can be energized to rotate the light rack assembly at least about 45 degrees when the light is not in use and thereby protect the light from damage when the off-road vehicle is in motion.

24. The light rack assembly of claim 21 wherein the means for vertically adjusting the beam of light of the light rack assembly comprises:
    a lever having a distal and a proximal end, the lever pivotally attached to a second frame member of the off-road vehicle at a location on the lever between the distal and the proximal end;
    a link member having opposed ends, one end pivotally attached to the distal end of the lever and the other end pivotally attached to the upper member of the frame;
    a linear actuator having opposed ends, one end pivotally attached to a second frame member of the off-road vehicle and the other end pivotally attached to the upper member of the frame; and,
    wherein the linear actuator can be energized to rotate the light rack assembly and thereby vertically adjust the beam of light to the preference of a driver of the off-road vehicle when the vehicle is in motion.

25. The light rack assembly of claim 24 wherein the link member is V-shaped having a central end and two opposed ends, the opposed ends of the V-shaped link member pivotally attached to the upper member of the frame and the central end of the V-shaped link member pivotally attached to the distal end of the lever.

26. The light rack assembly of claim 21 wherein the means for vertically adjusting the beam of light of the light rack assembly comprises:
    a lever having a distal and a proximal end, the lever pivotally attached to a second frame member of the off-road vehicle at a location on the lever between the distal and the proximal end;
    a link member having opposed ends, one end pivotally attached to the distal end of the lever and the other end pivotally attached to the upper member of the frame;
    wherein the light rack assembly can be rotated and thereby vertically adjust the beam of light to the preference of a driver of the off-road vehicle when the vehicle is in motion by manually rotating the proximal end of the lever.

27. The light rack assembly of claim 26 wherein the means for vertically adjusting the beam of light of the light rack assembly further comprises:
    a circumferential locking member attached to the second frame member of the off-road vehicle and in communication with the proximal end of the lever;
    a means for latching the proximal end of the lever to the locking member to secure the position of the light rack assembly and vertical adjustment of the beam of light to the preference of the driver.

28. The light rack assembly of claim 27 wherein the link member is V-shaped having a central end and two opposed ends, the opposed ends of the V-shaped link member pivotally attached to the upper member of the frame and the central end of the V-shaped link member pivotally attached to the distal end of the lever.

* * * * *